Patented June 3, 1947

2,421,737

UNITED STATES PATENT OFFICE 2,421,737

CHROME MONAZO COMPLEX

Byron L. West, Plainfield, and Charles Edward Lewis, Somerville, N. J., assignors to American Cyanamid Company, New York, N. Y., a corporation of Maine No Drawing. Application June 16, 1943, Serial No. 491,050

1 Claim. (Cl. 260—151)

This invention relates to metallized azo dyes from 4-chlor-2-aminophenol-6-sulfonic acid and Chicago acid.

A number of blue dyes have been prepared by diazotizing 4 - chlor-2-aminophenol - 6 - sulfonic acid and coupling with various amino naphthol sulfonic acids followed by metallizing. Notably such dyes have been prepared in which H acid and S acid have been the coupling components. These dyes dye wool, but they are not fast to light.

According to the present invention we have found that metallized dyes obtained by treatment of the azo dye made by coupling diazotized 4-chlor-2-aminophenol-6-sulfonic acid on Chicago acid give blue to violet shades on wool which show good fastness to light. The dyes of the present invention may contain any of the ordinary metallizing metals, such as chromium, iron, cobalt, nickel, copper, manganese and the like. However, we found that the chromium derivatives are particularly advantageous for wool dyeing, and these dyes constitute the preferred species of the present invention. It is an advantage of the invention that metallization of the dye proceeds smoothly by the conventional methods and all of the advantages of great light fastness and excellent shade are obtained without any disadvantages due to process difficulties.

Some of the metallized dyes of the present invention, particularly the chromium complex, have the important advantage that their spectral reflectance characteristics are such that the shade does not appear to change visually under artificial light. This is an important practical advantage as many blue dyes appear to change shade or become dull under artificial illumination.

The invention will be described in greater detail in the following examples, the parts of which are by weight.

Example 1

55.3 parts of the dyestuff of the formula:

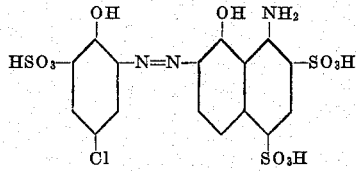

obtained by coupling diazotized 2-amino-4-chlorophenol-6-sulfonic acid to 1-amino-8-naphthol-2,4-disulfonic acid, are dissolved in 1,000 parts of water. Then 136 parts of a solution of basic chromium acetate, equivalent to 11.4 parts of chromic oxide and 18.0 parts of acetic acid, are added. The solution is boiled in a reflux apparatus provided with stirrer for 3 hours. Then 35 parts of dilute sulfuric acid solution, containing 7.35 parts of sulfuric acid, are added. The solution is then boiled in the reflux apparatus for 15 hours or until the metallization is complete. It is then cooled to room temperature. The dye is precipitated by adding 232 parts of sodium chloride and acidifying to Congo red paper with concentrated hydrochloric acid solution. The new dyestuff, which contains chromium, is filtered off and dried at moderate temperatures. It is a dark powder which dissolves in water. It dyes wool from a bath containing sulfuric acid bright blue shades having good fastness properties. This new dye retains its attractive bright blue shade when viewed under artificial light. In this respect it is superior to most metallized blue azo dyes.

Example 2

55.3 parts of the dyestuff of the formula given in Example 1, obtained by coupling diazotized 2-amino-4-chlorophenol-6-sulfonic acid to 1-amino-8-naphthol-2,4-disulfonic acid, are dissolved in 1500 parts of water. 100 parts of crystalline sodium acetate are added and are dissolved by stirring. Then 525 parts of a copper sulfate solution, containing 27.5 parts of $CuSO_4.5H_2O$, are added. The solution is boiled in a reflux apparatus until the formation of the complex copper derivative is complete. This operation usually requires about 3 hours. The solution is cooled to room temperature. The dye is precipitated by adding common salt and making the solution weakly acid. The new dyestuff which contains copper bound in a complex manner is a bluish black powder which dissolves in water. It dyes wool from a bath containing acetic acid violet shades.

We claim:

Chromium complex of an azo dye having the following formula:

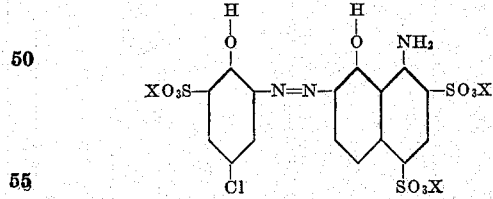

in which X is a member of the group consisting of hydrogen and metals.

BYRON L. WEST.
CHARLES EDWARD LEWIS.

REFERENCES CITED

The following references are of record in the file of this patent:

UNITED STATES PATENTS

| Number | Name | Date |
|---|---|---|
| 683,119 | Kaltwasser | Sept. 24, 1901 |
| 1,865,978 | Straub | July 5, 1932 |
| 1,581,572 | Fritzshe et al. | Apr. 20, 1926 |
| 1,213,608 | Engi et al. | Jan. 23, 1917 |

FOREIGN PATENTS

| Number | Country | Date |
|---|---|---|
| 683,119 | France | Sept. 24, 1901 |
| 769,766 | France | June 11, 1934 |
| 78,620 | Switzerland | Aug. 16, 1918 |

OTHER REFERENCES

Beristein, 4th edition, volume 14, page 811.